(12) United States Patent
Jolfaei

(10) Patent No.: US 11,204,932 B2
(45) Date of Patent: Dec. 21, 2021

(54) INTEGRATING DATABASE APPLICATIONS WITH BIG DATA INFRASTRUCTURE

(71) Applicant: SAP SE, Walldorf (DE)

(72) Inventor: Masoud Aghadavoodi Jolfaei, Wiesloch (DE)

(73) Assignee: SAP SE, Walldorf (DE)

( * ) Notice: Subject to any disclaimer, the term of this patent is extended or adjusted under 35 U.S.C. 154(b) by 375 days.

(21) Appl. No.: 16/279,865

(22) Filed: Feb. 19, 2019

(65) Prior Publication Data
US 2020/0265057 A1   Aug. 20, 2020

(51) Int. Cl.
*G06F 16/20* (2019.01)
*G06F 16/25* (2019.01)
*G06F 16/901* (2019.01)
*H04L 29/08* (2006.01)
*G06F 16/28* (2019.01)

(52) U.S. Cl.
CPC .......... *G06F 16/252* (2019.01); *G06F 16/289* (2019.01); *G06F 16/901* (2019.01); *H04L 67/2809* (2013.01)

(58) Field of Classification Search
None
See application file for complete search history.

(56) References Cited

U.S. PATENT DOCUMENTS

| | | | |
|---|---|---|---|
| 9,367,590 B1 * | 6/2016 | Chun | G06Q 10/06 |
| 2012/0097290 A1 * | 4/2012 | Mikhaeil | A61J 7/049 141/1 |
| 2016/0227282 A1 * | 8/2016 | Chang | H04N 21/4821 |
| 2017/0316094 A1 * | 11/2017 | Shekhar | G06F 16/9577 |

* cited by examiner

*Primary Examiner* — Belix M Ortiz Ditren
(74) *Attorney, Agent, or Firm* — Mintz Levin Cohn Ferris Glovsky and Popeo, P.C.

(57) ABSTRACT

A method may include receiving, from a client, an indication to include, in an application, a data processing pipeline implementing a data processing procedure that requires interaction with a data engine to retrieve and/or manipulate data in a data store coupled with the data engine. The application may be executed by exporting, to the data engine, a script corresponding to the data processing pipeline. Exporting the script may enable the data engine to execute the script to retrieve and/or manipulate data in the data store. The transfer of data resulting from the data engine executing the script may be monitored, for example, based on messages from the data engine. The messages may be exchanged via a message broker. Related systems and articles of manufacture, including computer program products, are also provided.

17 Claims, 5 Drawing Sheets

INTEGRATING DATABASE APPLICATIONS WITH BIG DATA INFRASTRUCTURE

TECHNICAL FIELD

The subject matter described herein relates generally to data processing and more specifically to integrating database applications and big data infrastructure.

BACKGROUND

Data processing may refer to the collection and/or manipulation of data including, for example, validation, sorting, summarization, aggregation, analysis, reporting, classification, and/or the like. However, traditional data processing applications may be inadequate for handling exceptionally voluminous and/or complex data sets known as "big data." Big data may be the product of common digital processes and social media exchange procedures taking place on nearly every mobile device, Internet-of-Things sensors, websites, and/or the like. Moreover, big data may require big data infrastructure with advanced capabilities to support the ingestion, cleansing, storage, analysis, sharing, transformation, and/or visualization of exceptionally voluminous and/or complex data sets.

SUMMARY

Systems, methods, and articles of manufacture, including computer program products, are provided for integrating database applications with big data infrastructure. In one aspect, there is provided a system including at least one data processor and at least one memory. The at least one memory may store instructions that cause operations when executed by the at least one data processor. The operations may include: receiving, from a client, an indication to include, in an application, a data processing pipeline implementing a first data processing procedure, the first data processing procedure requiring interaction with a data engine to retrieve and/or manipulate at least a portion of data in a data store coupled with the data engine; executing the application by at least exporting, to the data engine, a script corresponding to the data processing pipeline, the script being exported to the data engine to at least enable the data engine to execute the script to retrieve and/or manipulate at least the portion of data in the data store; and monitoring a transfer of data from the data engine, the data comprising a result of the data engine executing the script.

In some variations, one or more features disclosed herein including the following features can optionally be included in any feasible combination. The script may include one or more commands for retrieving and/or manipulating at least the portion of the data stored in the data store.

In some variations, the script may be implemented in a scripting language associated with the data engine. The scripting language may include structured query language (SQL), HANA SQL, Scala, Python, and/or JavaScript.

In some variations, the data store may be a big data store configured to store unstructured data forming big data.

In some variations, the data may be transferred from the data engine as a continuous stream or in batches.

In some variations, the application may include a second data processing procedure that requires interaction with to a relational database management system (RDBMS) to retrieve and/or manipulate at least a portion of structured data stored in a relational database coupled with the relational database management system.

In some variations, a secure connection may be established with the data engine for transferring data from the data engine. The secure connection may include a hypertext transfer protocol (HTTP) connection, a WebSocket connection, and/or a transmission control protocol (TCP) socket connection.

In some variations, the monitoring of the transfer of data may include detecting one or more errors that occur during the transfer of data. The one or more errors may be detected based on one or more messages from the data engine. The one or more messages from the data engine may be pushed to a topic at a message broker. The application engine may receive the one or more messages by at least pulling the one or more messages from the topic at the message broker.

In some variations, the application may be implemented in a high level programming language.

In some variations, the application may be implemented in an Advanced Business Application Programming (ABAP) programming language.

In some variations, the indication from the client may include the client selecting the data processing pipeline from a library including a plurality of data processing pipelines. Each of the plurality of data processing pipelines may implement a corresponding data processing procedure.

In some variations, the executing of the application may further include exporting, to the data engine, application data, context information, and/or metadata.

In some variations, the script corresponding to the data processing pipeline may be encrypted and/or anonymized prior to be exported to the data engine.

In another aspect, there is provided a method for integrating database applications with big data infrastructure. The method may include: receiving, from a client, an indication to include, in an application, a data processing pipeline implementing a data processing procedure, the data processing procedure requiring interaction with a data engine to retrieve and/or manipulate at least a portion of data in a data store coupled with the data engine; executing the application by at least exporting, to the data engine, a script corresponding to the data processing pipeline, the script being exported to the data engine to at least enable the data engine to execute the script to retrieve and/or manipulate at least the portion of data in the data store; and monitoring a transfer of data from the data engine, the data comprising a result of the data engine executing the script.

In some variations, one or more features disclosed herein including the following features can optionally be included in any feasible combination. The script may include one or more commands for retrieving and/or manipulating at least the portion of the data stored in the data store. The script may be implemented in a scripting language associated with the data engine. The scripting language may include structured query language (SQL), HANA SQL, Scala, Python, and/or JavaScript.

In some variations, the data store may be a big data store storing unstructured data forming big data.

In another aspect, there is provided a computer program product that includes a non-transitory computer readable medium storing instructions. The instructions may cause operations when executed by at least one data processor. The operations may include: receiving, from a client, an indication to include, in an application, a data processing pipeline implementing a data processing procedure, the data processing procedure requiring interaction with a data engine to retrieve and/or manipulate at least a portion of data in a data store coupled with the data engine; executing the application by at least exporting, to the data engine, a script corresponding to the data processing pipeline, the script being exported to the data engine to at least enable the data engine to execute the script to retrieve and/or manipulate at least the portion of data in the data store; and monitoring a transfer of data from the data engine, the data comprising a result of the data engine executing the script.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to integrating database applications and big data infrastructure, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
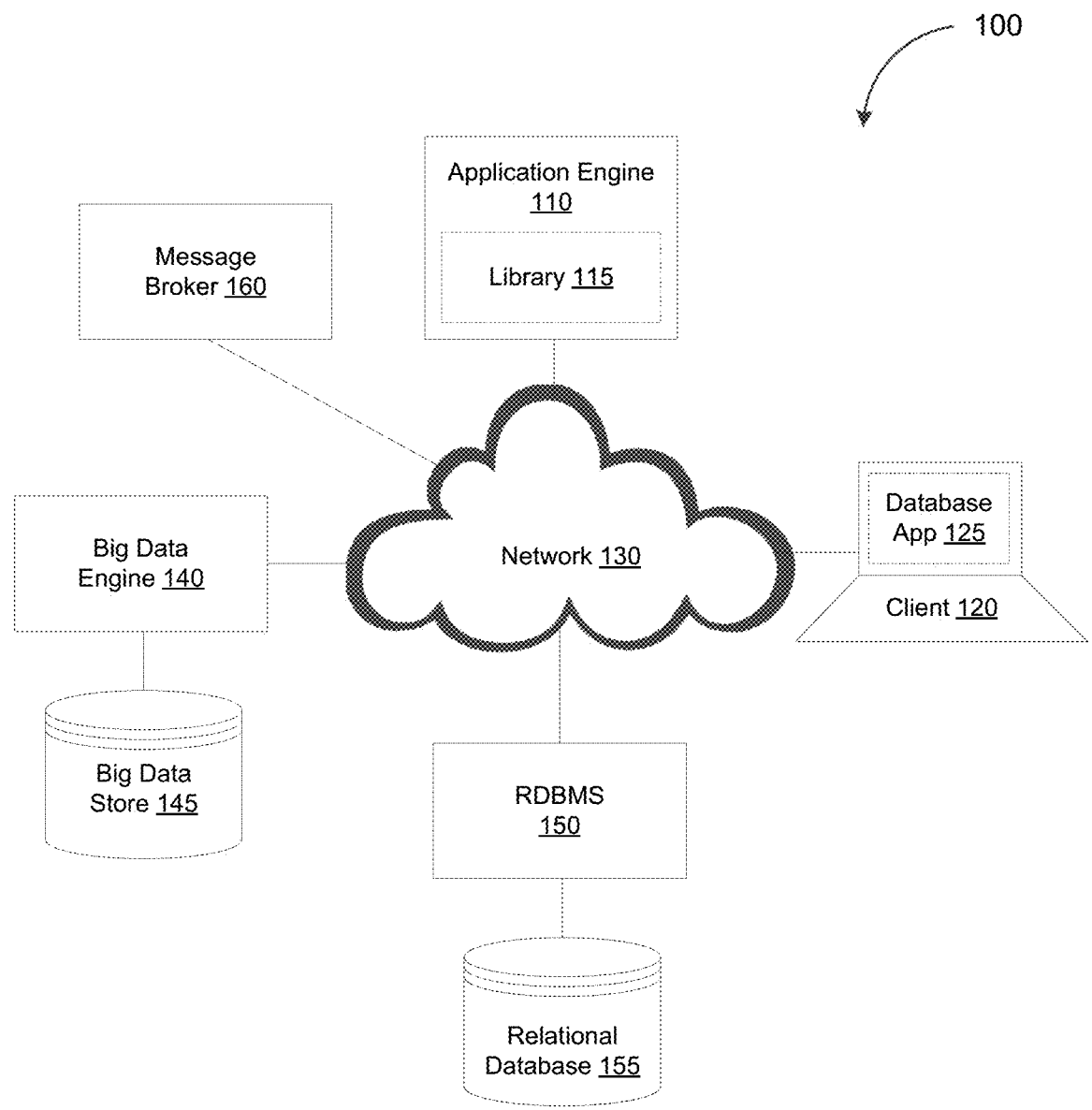
FIG. 1 depicts a system diagram illustrating a data processing system, in accordance with some example embodiments.

An application may include a series of data processing procedures for retrieving and/or manipulating data stored in different databases systems. Traditional relational database management systems (RDBMS) may be suitable for storing conventional data having a structured format. By contrast, big data stores specifically tailored for storing unstructured data may be required for storing big data without a structured format. As such, an application that retrieves and/or manipulates big data may require integration with the corresponding big data stores. Nevertheless, the complexity of integrating the application with the big data stores should remain transparent to the developers of the application. Accordingly, in some example embodiments, an application engine may be configured to support the development and execution of an application that requires access to at least one big data store to retrieve and/or manipulate big data. For example, the application engine may provide an abstraction layer between the application and the big data store such that the application may be developed and executed without minimal knowledge of the underlying big data store.

An application may be developed to include a data processing procedure that requires access to a big data store. Nevertheless, the application may be developed and executed with minimal knowledge of the big data store including, for example, the options for connecting to and accessing the big data store. Thus, in some example embodiments, the application engine may provide one or more data processing pipelines. As used herein, data processing pipeline may include a series of operations implementing a data processing procedure that may be performed at a big data store. For example, the data processing pipeline may include a script, which may be exported to and executed at a big data store. Alternatively and/or additionally, the application engine may also export, to the big data engine, application data, context information, and/or metadata including, for example, username, client, language, Internet Protocol (IP) address, Global Positioning System (GPS) coordinates system release, application package identifier, and/or the like. A big data engine coupled with the big data store may execute the script including by performing the corresponding data processing procedure on the data in the big data store. The result of operating on the data in the big data store may be sent back to the application engine. As such, as part of executing the database application, the application engine may establish a secure connection with the big data store for transferring, back to the application engine, data that includes the result of the script executed at the big data store data processing procedure. Alternatively and/or additionally, during the execution of the application, the application engine may monitor the retrieval of data from the big data store. For instance, the application engine may diagnose, analyze, and/or log errors that occur during the transfer of big data from the big data store.

FIG. 1 depicts a system diagram illustrating a data processing system 100, in accordance with some example embodiments. Referring to FIG. 1, the data processing system 100 may include an application engine 110 communicatively coupled with one or more clients including, for example, a client 120 and/or the like. The client 120 may be any processor-based device including, for example, a workstation, a desktop computer, a laptop computer, a tablet computer, a mobile device, a wearable apparatus, and/or the like. As shown in FIG. 1, the application engine 110 and the client 120 may be communicatively coupled via a network 130. The network 130 may be any wired and/or wireless network including, for example, a public land mobile network (PLMN), a wide area network (WAN), a local area network (LAN), a virtual local area network (VLAN), the Internet, and/or the like.

In some example embodiments, the client 120 may interact with the application engine 110 to develop an application 125 that includes a series of data processing procedures. The application 125 may include at least one data processing procedure that require access to a big data store optimized for storing unstructured big data. For example, the application 125 may include a data processing procedure that requires interaction with a big data engine 140 to retrieve and/or manipulate big data stored in a big data store 145 coupled with the big data engine 140. Alternatively and/or additionally, the application 125 may include at least one data processing procedure that require access to a conventional database systems optimized for storing structured data. For instance, the application 125 may include a data processing procedure that requires interaction with a relational database management system (RDBMS) 150 to retrieve and/or manipulate data from a relational database 155 coupled with the relational database management system 150.

Figure 2:
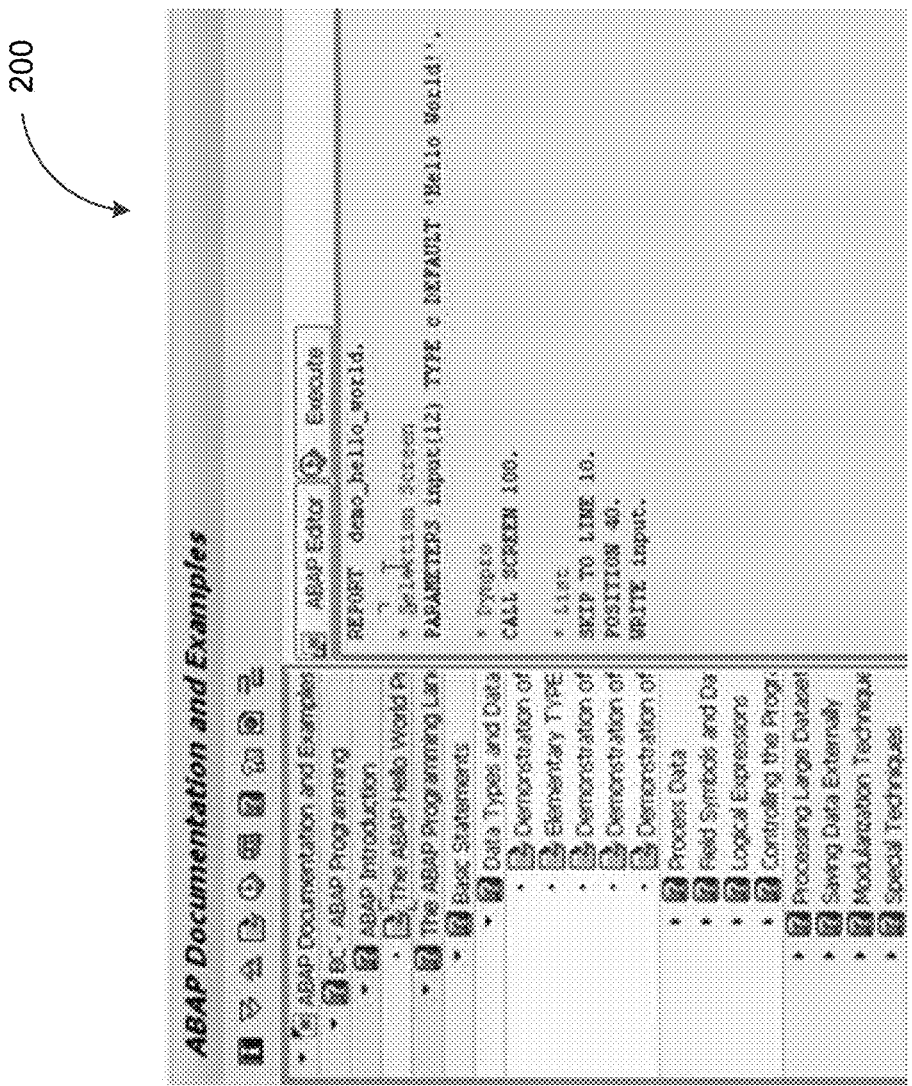
FIG. 2 depicts an example of user interface associated with a source code editor, in accordance with some example embodiments.

The client 120 may develop the application 125 using a source code editor. For instance, FIG. 2 depicts an example of a user interface 200 associated with a source code editor, in accordance with some example embodiments. The application engine 110 may generate the user interface 200 for display at the client 120 such that the corresponding source code editor may be used to generate the source code associated with the application 125. In some example embodiments, the application 125 may be implemented in a high-level programming language such as, for example, Advanced Business Application Programming (ABAP) and/or the like. Accordingly, the user interface 200 may be displayed at the client 120 such that the client 120 may input, in a high-level programming language, programming code to implement the application 125.

In some example embodiments, the application engine 110 may be configured to support the development and execution of the application 125, which may require interactions with the big data engine 140 to retrieve and/or manipulate data in the big data engine 140. Accordingly, the application engine 110 may integrate the application 125 with the big data engine 140. In order to for the application 125 to be integrated with the big data engine 140 with minimal intervention from the client 120, the application engine 110 may serve as an abstraction layer between the client 120 and the big data engine 140. As such, the application 125 may be developed and executed with minimal knowledge of the underlying big data engine 140 including, for example, options for connecting to and accessing the big data engine 140. The big data engine 140 may be any type of engine configured to access an underlying big data store including, for example, a streaming engine, a machine-learning engine, an in-memory structured query language (SQL) engine, a time series engine, and/or the like.

In some example embodiments, the application engine 110 may provide, to the client 120, one or more data processing pipelines. For instance, as shown in FIG. 1, the data processing pipelines may be made available to the client 120 as part of a library 115 associated with the application engine 110. Each data processing pipeline may provide the logic for manipulating and/or retrieving data from the big data store 145. For example, a data processing pipeline may be exported to and executed as a script by the big data engine 140 to retrieve and/or manipulate data from the big data store 145. Moreover, in addition to exporting the data processing pipeline, the application engine 110 may also export application data, context information, and/or metadata including, for example, username, client, language, Internet Protocol (IP) address, Global Positioning System (GPS) coordinates system release, application package identifier, and/or the like. Accordingly, as part of developing the application 125, the client 120 may select a data processing pipeline in order to include, in the application 125, a data processing procedure to retrieve and/or manipulate data from the big data store 145.

A data processing procedure for manipulating and/or retrieving data from the big data store 145 may be implemented as a data processing pipeline. Moreover, as noted, the client 120 may develop the application 125 to include a data processing procedure for manipulating and/or retrieving data from the big data store 145 by at least selecting and adding a corresponding data processing pipeline to the application 125. For example, a data processing pipeline may be a method or function that may be invoked in the high-level programming language (Advanced Business Application Programming (ABAP) and/or the like) of the application 125. As such, the client 120 may select and add a data processing pipeline to the application 125 may by including, in the programming code associated with the application 125, the corresponding method or function.

In some example embodiments, a data processing pipeline may include one or more operator nodes, each of which corresponding to an operation included in the corresponding data processing procedure. The operator nodes in the data processing pipeline may be interconnected by one or more directed edges. A directed edge interconnecting two or more operator nodes may indicate a flow of data between the corresponding data processing operations.

Figure 3:
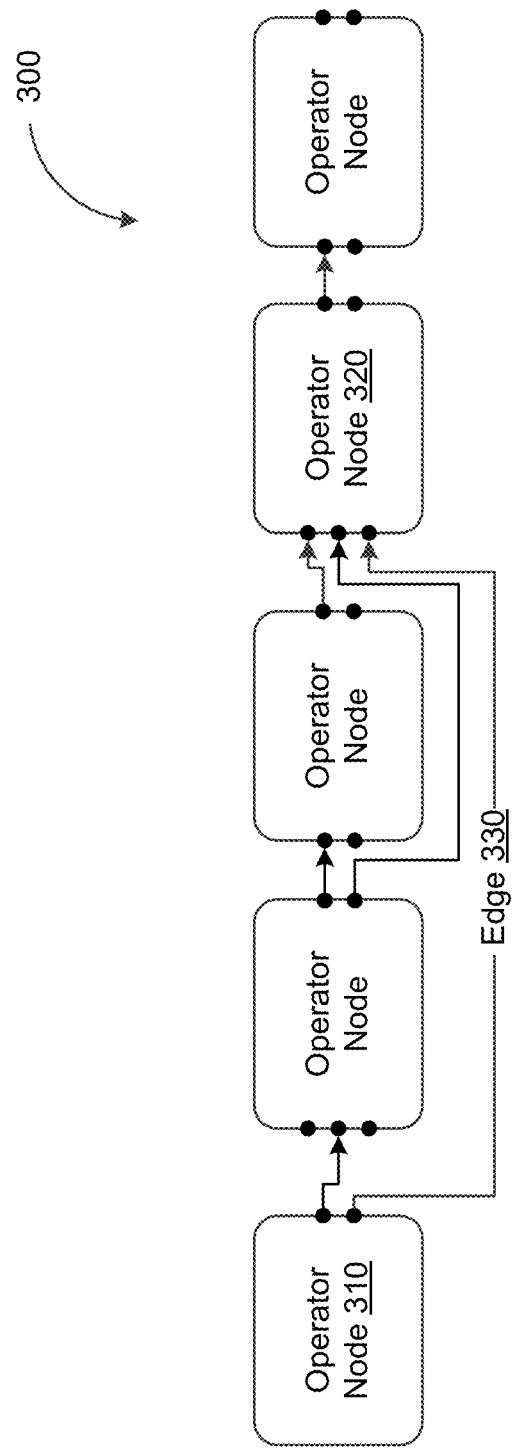
FIG. 3 depicts an example of a data processing pipeline, in accordance with some example embodiments.

To further illustrate, FIG. 3 depicts an example of a data processing pipeline 300, in accordance with some example embodiments. According to some example embodiments, the data processing pipeline 300 may be available to the client 120 as part of the library 115 associated with the application engine 110. The data processing pipeline 300 may be a method or a function that may be invoked in the high-level programming language (Advanced Business Application Programming (ABAP) and/or the like) of the application 125. As such, the client 120 may select and add the data processing pipeline 300 to the application 125 by including, in the programming code associated with the application 125, the corresponding method or function. In doing so, the client 120 may develop the application 125 to retrieve and/or manipulate data from the big data store 145 with minimal knowledge of the underlying big data engine 140 including, for example, options for connecting to and accessing the big data engine 140.

As shown in FIG. 3, the data processing pipeline 300 may include one or more operator nodes including, for example, a first operator node 310, a second operator node 320, and/or the like. The first operator node 310 and the second operator node 320 may each correspond to a data processing operation that is performed on at least a portion of the data stored in the big data store 145. Furthermore, the data processing pipeline 300 may include one or more directed edges including, for example, an edge 330. The directionality of the edge 330 interconnecting the first operator node 310 and the second operator node 320 may indicate a flow of data between the data processing operations corresponding to the first operator node 310 and the second operator node 320. For instance, in the example shown in FIG. 3, an output of a first data processing operation corresponding to the first operator node 310 may be provided as an input to a second data processing operation corresponding to the second operator node 320.

In some example embodiments, as part of executing the application 125, the data processing pipeline 300 may be exported to the big data engine 140 by the application engine 110. Moreover, application data, context information, and/or metadata (e.g., username, client, language, Internet Protocol (IP) address, Global Positioning System (GPS) coordinates system release, application package identifier, and/or the like) may also be exported to the big data engine 140 by the big data engine 110 as part of executing the application 125. The script, application data, context information, and/or metadata may be anonymized and/or encrypted prior to being transferred to the big data engine 140. Moreover, the export of the script, application data, context information, and/or metadata may not occur upon development of the application 125. Instead, the export of the script, application data, context information, and/or metadata occur lazily, for example, triggered by the first execution of the application 125 during the configuration and/or testing of the application 125.

For instance, the data processing pipeline 300 may be exported to the big data engine 140 as a script in the scripting language associated with the big data engine 140 including, for example, structured query language (SQL), HANA SQL, Scala, Python, JavaScript, and/or the like. The script may include a set of commands that may be executed by the big data engine 140 to retrieve and/or manipulate data from the big data store 140. Moreover, the script may be executed by the big data engine 140 without needing any compilation. As such, the big data engine 140 may execute the script corresponding to the data processing pipeline 300 in real time to retrieve and/or manipulate data from in the big data store 145. For example, by executing the script at the big data engine 140, data at the manipulated and retrieved from the big data store 145 in a continuous stream of window size and/or micro-batch quantities of data.

It should be appreciated that during execution of the script corresponding to the data processing pipeline 300 at the big data engine 140, one or more of the operator nodes (e.g., the first operator node 310, the second operator node 320, and/or the like) may make one or more calls to the application engine 110, for example, to retrieve data from the application engine 110. The calls to the application engine 110 may include requests to execute, at the application engine 110, programming code (e.g., Advanced Business Application Programming (ABAP) code) to retrieve data.

For example, the client 120 may develop the application 125 to include a data processing pipeline for retrieving a selection of data from the big data store 145. The data processing pipeline may implement the database procedure SELECT. As such, the client 120 may include, in the programming code associated with the application 125, the statement SELECT * FROM SFLIGHT, which may operate on a data set SFLIGHT in the big data store 145. Table 1 below depicts a script corresponding to the data processing pipeline associated with the database procedure SELECT. This script may be implemented in the scripting language (e.g., SQL, HANA SQL, Scala, Python, JavaScript, and/or the like) associated with the big data engine 140. As such, by exporting the script to the big data engine 140, the big data engine 140 may execute the script corresponding to statement SELECT * FROM SFLIGHT to retrieve the corresponding data from the big data store 145.

TABLE 1 import sqlContext.implicits._\nval SFLIGHT = sqlContext.read.json ("hdfs://mo-7619a6f6b.mosap.corp:8020/sap/abap/bc/alx/system/tables/sflight.json") \nSFLIGHT.registerTempTable ("SFLIGHT")\nval result = sqlContext.sql ("SELECT * FROM SFLIGHT") \nresult.show(10000)\n In some example embodiments, in order to execute the application 125 including the data processing pipeline 300 for manipulating and retrieving data from the big data store 145, the application engine 110 may establish a secure connection with the big data engine 140. For instance, the application engine 110 may establish a hypertext transfer protocol (HTTP) connection, a Web Socket connection, and/or a transmission control protocol (TCP) socket connection with the big data engine 140. This connection may subsequently be used for transferring, from the big data engine 140, the result of executing the script corresponding to the processing pipeline 300. For example, the big data engine 140 may execute the script to retrieve and/or manipulate data from the big data store 145. The result of the big data engine 140 retrieving and/or manipulating data from the big data store 145 may be transferred back to the application engine 110. Nevertheless, it should be appreciated that the options for establishing the secure connection to the big data engine 140 may remain transparent to the client 120. For example, the application engine 110 may establish and maintain the secure connection with the big data engine 140 with minimal intervention from the client 120.

In some example embodiments, the application engine 110 may ingest the big data retrieved from the big data engine 140, for example, in batches or as a continuous stream of data (e.g., window size and/or micro-batch quantities of data). The application engine 110 may be further configured to monitor the ingestion of big data including, for example, by diagnosing, analyzing, and/or logging errors that occur during the ingestion of the big data. Moreover, the application engine 110 may provide, to the client 120, an indication of the status of the data ingestion. For example, in the event the application engine 110 detects an error during the ingestion of big data from the big data engine 140, the application engine 110 may generate and/or update a user interface (e.g., a graphic user interface (GUI) and/or the like) at the client 120 to display an indication of the error.

In some example embodiments, in order to monitor the ingestion of big data from the big data engine 140, the application engine 110 may exchange one or more messages with the big data engine 140. Referring again to FIG. 1, instead of a direct exchange of messages, the application engine 110 may be communicatively coupled, via the network 130, with a message broker 160. The message broker 160 may be configured to enable the exchange of messages between the application engine 110 and the big data engine 140. In addition, the message broker 160 may also be configured to enable the exchange of messages between the application 110 and the database system 150.

For example, the message broker 160 may be a distributed messaging system in which the application engine 110 may act as a consumer and the big data engine 140 may act as a producer. The big data engine 140, as a producer, may push messages to one or more topics. These messages may be indicative of the status of the transfer of big data from the big data engine 140 to the application engine 110. Accordingly, the application engine 110, in its role as a consumer, may pull messages from the one or more topics. Moreover, the application engine 110 may determine, based on one or more messages from the big data engine 140, whether an error has occurred during the transfer of big data from the big data engine 140 to the application engine 110.

In some example embodiments, the application engine 110 may serve as an abstraction layer between the client 120 and the big data engine 140 such that the complexities of integrating the application 125 with the big data engine 140 may remain transparent to the client 120. For example, the application engine 110 may manage the metadata associated with the data retrieved from the big data engine 140 such that the client 120 may develop the application 125 to manipulate the data from the big data store 145 without minimal knowledge of the definition and/or description associated with that data. Alternatively and/or additionally, the application engine 110 may manage the storage options associated with the data retrieved from the big data engine 140. For instance, the application engine 110 may determine redundancy and/or compression options for the data retrieved from the big data engine 140 with minimal intervention from the client 120.

Figure 4:
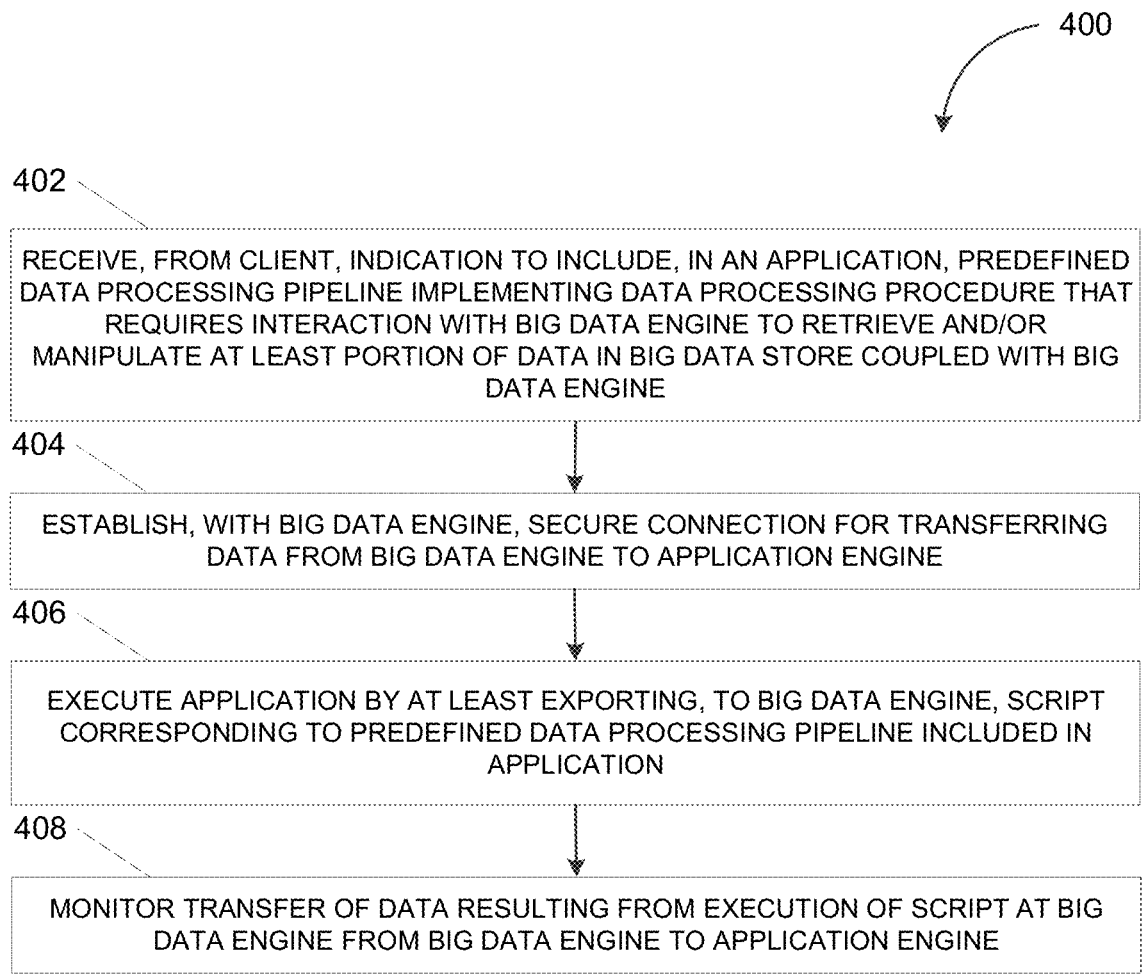
FIG. 4 depicts a flowchart illustrating a process for integrating an application with a big data store, in accordance with some example embodiments.

FIG. 4 depicts a flowchart illustrating a process 400 for integrating an application with a big data store, in accordance with some example embodiments. Referring to FIGS. 1-4, the process 400 may be performed by the application engine 110 in order to integrate, for example, the application 125 with the big data engine 140. As noted, the application 125 may require the retrieval and/or manipulation of big data stored in the big data engine 140. However, the application 125 may be developed with minimal knowledge of the underlying big data engine 140. Instead, the application engine 110 may integrate the application 125 with the big data engine 140 such that the big data engine 140 may be accessed during the execution of the application 125 to retrieve and/or manipulate at least a portion of the big data stored in the big data engine 140.

At 402, the application engine 110 may receive, from the client 120, an indication to include, in an application, a data processing pipeline implementing to a data processing procedure that requires interaction with a big data engine to retrieve and/or manipulate at least a portion of data in a big data store coupled with the big data engine. For example, as part of developing the application 125, the client 120 may select, from the library 115, the data processing pipeline 300. The data processing pipeline 300 may be added to the application 125 such that executing the application 125 may require interacting with the big data engine 140 to retrieve and/or manipulate data in the big data store 145 coupled with the big data engine 140.

At 404, the application engine 110 may establish, with the big data engine, a secure connection for transferring big data from the big data engine to the application engine 110. For instance, in order to execute the application 125, the application engine 110 may establish a secure connection with the big data engine 140 including, for example, a hypertext transfer protocol (HTTP) connection, a WebSocket connection, a transmission control protocol (TCP) socket connection, and/or the like. This connection may subsequently be used for transferring data from the big data engine 140 to the application engine 110. Nevertheless, it should be appreciated that the options for establishing the secure connection to the big data engine 140 may remain transparent to the client 120. For example, the application engine 110 may establish and maintain the secure connection with the big data engine 140 with minimal intervention from the client 120.

At 406, the application engine 110 may execute the application by at least exporting, to the big data engine, a script corresponding to the data processing pipeline included in the application. For example, to execute the application 125, the application engine 110 may export, to the big data engine 140, a script corresponding to the data processing pipeline included the application 125. The script may be implemented in the scripting language associated with the big data engine 140 including, for example, structured query language (SQL), HANA SQL, Scala, Python, JavaScript, and/or the like. Moreover, the script may be exported to the big data engine 140 such that the big data engine 140 may execute the script to retrieve and/or manipulate data from the big data store. For instance, the script may be executed by the big data engine 140 in real time to retrieve and/or manipulate a continuous stream of data (e.g., window size and/or micro-batch quantities of data) from the big data store 145. It should be appreciated that in addition to exporting the data processing pipeline, the application engine 110 may also export, to the big data engine, application data, context information, and/or metadata including, for example, username, client, language, Internet Protocol (IP) address, Global Positioning System (GPS) coordinates system release, application package identifier, and/or the like.

At 408, the application engine 110 may monitor the transfer of data resulting from execution of the script at the big data engine from the big data engine to the application engine 110. As noted, the application engine 110 may execute the application 125 by at least exporting, to the big data engine 140, a script corresponding to the data processing pipeline 300 included in the application 125. The result of the big data engine 140 executing the script, for example, to retrieve and/or manipulate data in the big data store 145, may be transferred back to the application engine 110. Data may be transferred from the big data engine 140 to the application engine 110 in a continuous stream and/or in batches.

In order to monitor the transfer of data from the big data engine 140 to the application engine 110, the application engine 110 may exchange one or more messages with the big data engine 140 via the message broker 160. For example, the application engine 110 may be communicatively coupled, via the network 130, with the message broker 160, which may be configured to enable the exchange of messages between the application engine 110 and the big data engine 140. The big data engine 140 may be a producer pushing messages to one or more topics at the message broker 160 while the application engine 110 may be a consumer pulling messages from the one or more topics. The messages that the big data engine 140 pushes to the one or more topics may be indicative of the status of the transfer of data from the big data engine 140 to the application engine 110. As such, the application engine 110 may determine, based on one or more messages from the big data engine 140, whether an error has occurred during the transfer of data from the big data engine 140 to the application engine 110.

Figure 5:
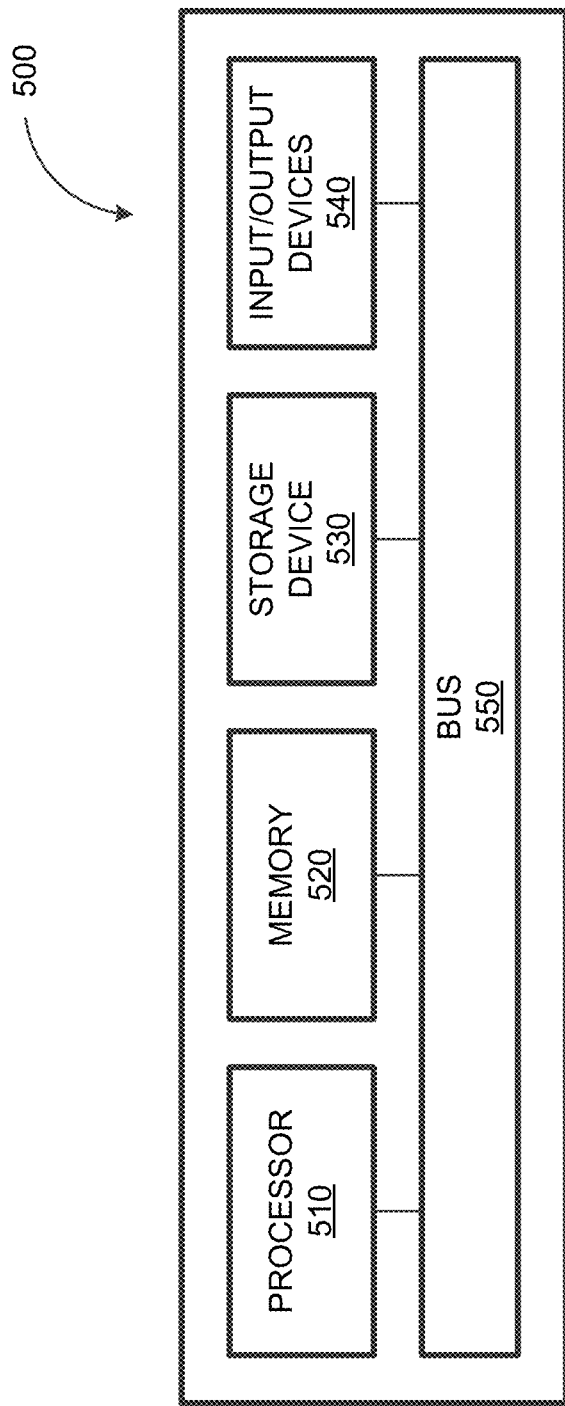
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the application engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the application engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid-state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving, from a client, an indication to include, in an application, a data processing pipeline implementing a first data processing procedure, the first data processing procedure requiring interaction with a data engine to access at least a portion of data in a data store coupled with the data engine;
   executing the application by at least exporting, to the data engine, a script corresponding to the data processing pipeline, the script being exported to the data engine to at least enable the data engine to execute the script to access at least the portion of data in the data store;
   pulling, from a topic at a message broker, one or more messages pushed to the topic at the message from the data engine; and
   monitoring, based at least on the one or more messages, a transfer of data from the data engine to detect one or more errors that occur during the transfer of data, the data comprising a result of the data engine executing the script.

2. The system of claim 1, wherein the script includes one or more commands for accessing at least the portion of the data stored in the data store.

3. The system of claim 1, wherein the script is implemented in a scripting language associated with the data engine, and wherein the scripting language comprises at least one of a structured query language (SQL), HANA SQL, Scala, Python, and JavaScript.

4. The system of claim 1, wherein the data store comprises a big data store configured to store unstructured data comprising big data.

5. The system of claim 1, wherein the data is transferred from the data engine as a continuous stream or in batches.

6. The system of claim 1, wherein the application includes a second data processing procedure that requires interaction with to a relational database management system (RDBMS) to access at least a portion of structured data stored in a relational database coupled with the relational database management system.

7. The system of claim 1, further comprising:
   establishing, with the data engine, a secure connection for transferring the data from the data engine.

8. The system of claim 7, wherein the secure connection comprises at least one of a hypertext transfer protocol (HTTP) connection, a Web Socket connection, and a transmission control protocol (TCP) socket connection.

9. The system of claim 1, wherein the application is implemented in a high level programing language.

10. The system of claim 1, wherein the application is implemented in an Advanced Business Application Programming (ABAP) programming language.

11. The system of claim 1, wherein the indication from the client includes the client selecting the data processing pipeline from a library including a plurality of data processing pipelines, and wherein each of the plurality of data processing pipelines implements a corresponding data processing procedure.

12. The system of claim 1, wherein the executing of the application further includes exporting, to the data engine, at least one of an application data, a context information, and a metadata.

13. The system of claim 1, wherein the script corresponding to the data processing pipeline is subjected to at least one of an encryption and an anonymization prior to being exported to the data engine.

14. A computer-implemented method, comprising:
   receiving, from a client, an indication to include, in an application, a data processing pipeline implementing a first data processing procedure, the first data processing procedure requiring interaction with a data engine to access at least a portion of data in a data store coupled with the data engine;
   executing the application by at least exporting, to the data engine, a script corresponding to the data processing pipeline, the script being exported to the data engine to at least enable the data engine to execute the script to access at least the portion of data in the data store;
   pulling, from a topic at a message broker, one or more messages pushed to the topic at the message from the data engine; and
   monitoring, based at least on the one or more messages, a transfer of data from the data engine to detect one or more errors that occur during the transfer of data, the data comprising a result of the data engine executing the script.

15. The method of claim 14, wherein the script includes one or more commands for accessing at least the portion of the data stored in the data store, and wherein the script is implemented in a scripting language associated with the data engine, and wherein the scripting language comprises at least one of a structured query language (SQL), HANA SQL, Scala, Python, and JavaScript.

16. The method of claim 14, wherein the data store comprises a big data store configured to store unstructured data comprising big data.

17. A non-transitory computer readable medium storing instructions, which when executed by at least one data processor, result in operations comprising:
   receiving, from a client, an indication to include, in an application, a data processing pipeline implementing a first data processing procedure, the first data processing procedure requiring interaction with a data engine to access at least a portion of data in a data store coupled with the data engine;
   executing the application by at least exporting, to the data engine, a script corresponding to the data processing pipeline, the script being exported to the data engine to at least enable the data engine to execute the script to access at least the portion of data in the data store;

pulling, from a topic at a message broker, one or more messages pushed to the topic at the message from the data engine; and monitoring, based at least on the one or more messages, a transfer of data from the data engine to detect one or more errors that occur during the transfer of data, the data comprising a result of the data engine executing the script.

* * * * *